United States Patent [19]

Edwards et al.

[11] Patent Number: 4,615,101
[45] Date of Patent: Oct. 7, 1986

[54] TOOL INTERFACE FOR ROBOT END EFFECTORS

[75] Inventors: Jeffrey A. Edwards; Thomas W. Peterson, both of Corvallis, Oreg.

[73] Assignee: Intelledex Incorporated, Corvallis, Oreg.

[21] Appl. No.: 709,596

[22] Filed: Mar. 8, 1985

[51] Int. Cl.4 .................. B23Q 3/155; B23B 31/30
[52] U.S. Cl. .................. 29/568; 279/1 TS; 279/4; 279/50
[58] Field of Search ............ 279/4, 50, 1 TS; 29/568

[56] References Cited

U.S. PATENT DOCUMENTS

| 3,599,998 | 8/1971 | Kiwalle et al. | 279/4 X |
|---|---|---|---|
| 3,625,530 | 12/1971 | Parsons | 279/4 |
| 3,643,969 | 2/1972 | Finley et al. | 279/4 |
| 3,659,863 | 5/1972 | Buttner | 279/50 X |
| 3,880,046 | 4/1975 | Sessody | 279/4 |
| 3,909,062 | 9/1975 | Benatti | 279/47 |
| 3,933,061 | 1/1976 | Link | 279/4 X |
| 3,999,770 | 12/1976 | Sollami | 279/4 |
| 4,032,162 | 6/1977 | Flinchbaugh | 279/4 |
| 4,094,521 | 6/1978 | Piotrowski | 279/4 |
| 4,103,914 | 8/1978 | Rohm | 279/4 |
| 4,220,430 | 9/1980 | Meiser et al. | 29/568 X |
| 4,312,105 | 1/1982 | Brown | 29/568 X |
| 4,566,705 | 1/1986 | Jenny | 279/4 |
| 4,576,528 | 3/1986 | Sollami | 408/140 |

OTHER PUBLICATIONS

Applied Robotics, News, "Unique Hand Change System to be Unveiled at Robots 8".

Primary Examiner—Gil Weidenfeld
Assistant Examiner—Steven C. Bishop

[57] ABSTRACT

A tool interface has a rotatable tool changer for holding a tool on the end of a robot arm. The tool changer is a socket chuck having spring jaws in a socket for clamping the tool. A spring actuated sleeve slides longitudinally into wedging engagement with an inclined surface on the jaws. Fluid pressure moves an annular piston against the spring to disengage the sleeve from the jaws, and thus release the tool. A motor couples through a harmonic wave generator to a shaft on the axis of the tool changer for rotating a tool. An angular position sensor and encoder, such as an inductosyn, is used to determine the orientation of the tool. Fluid and electrical supply lines from the robot arm are connected to the tool changer for supplying electrical, hydraulic, pneumatic, and vacuum connections to the tool.

5 Claims, 6 Drawing Figures

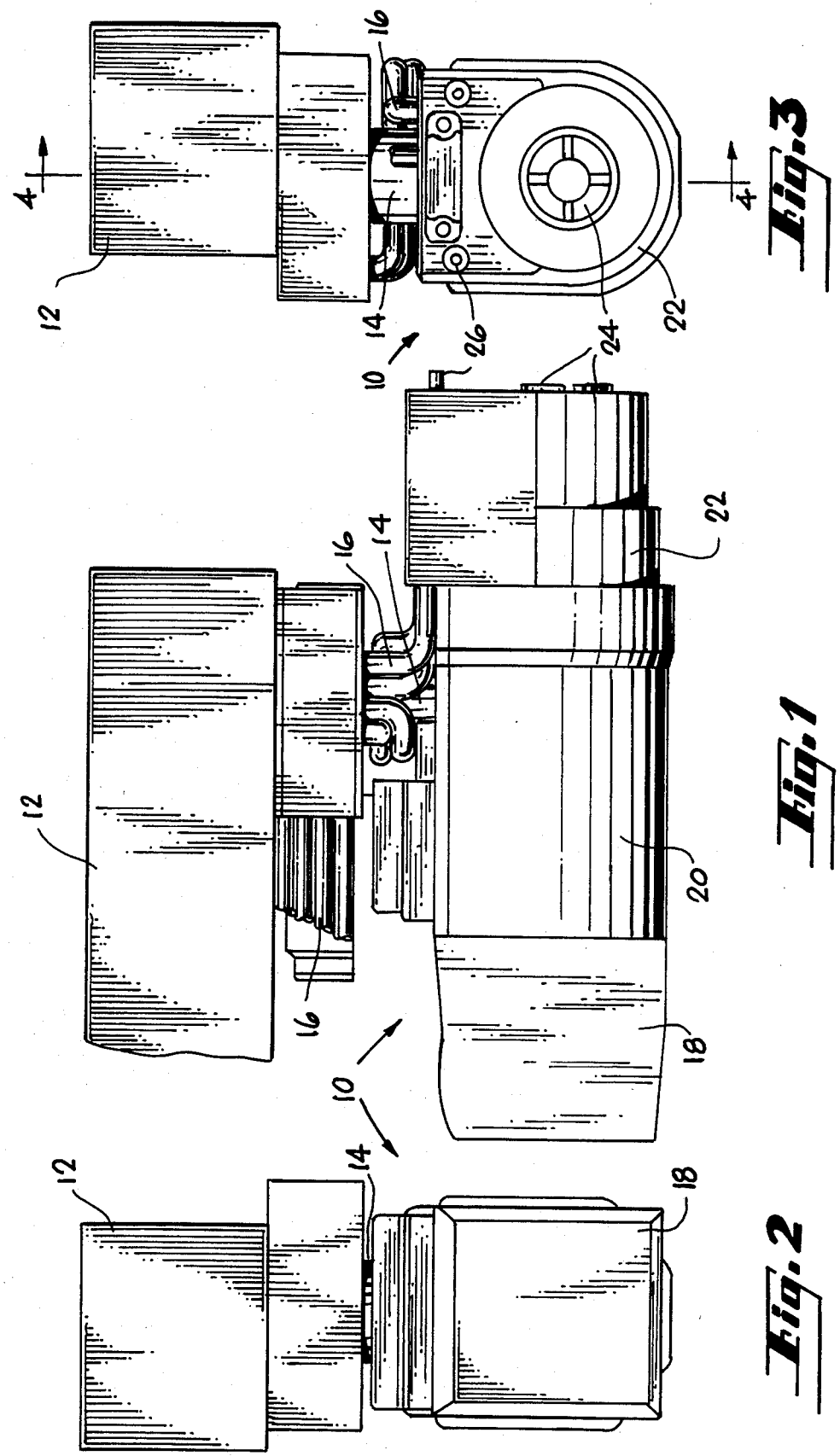

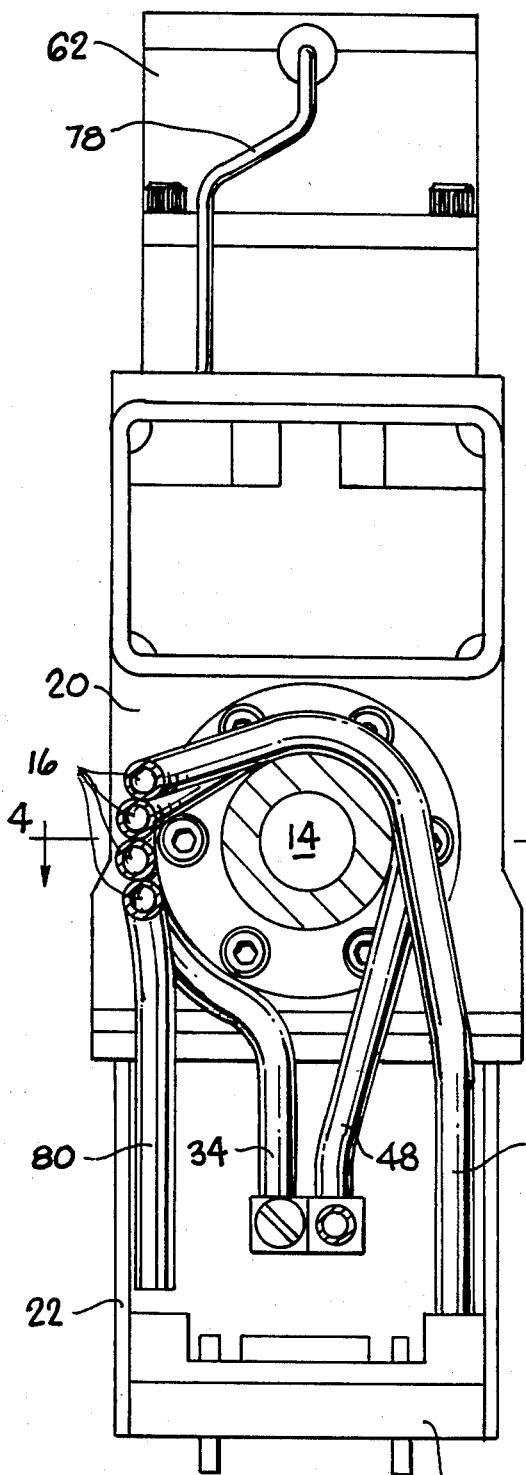
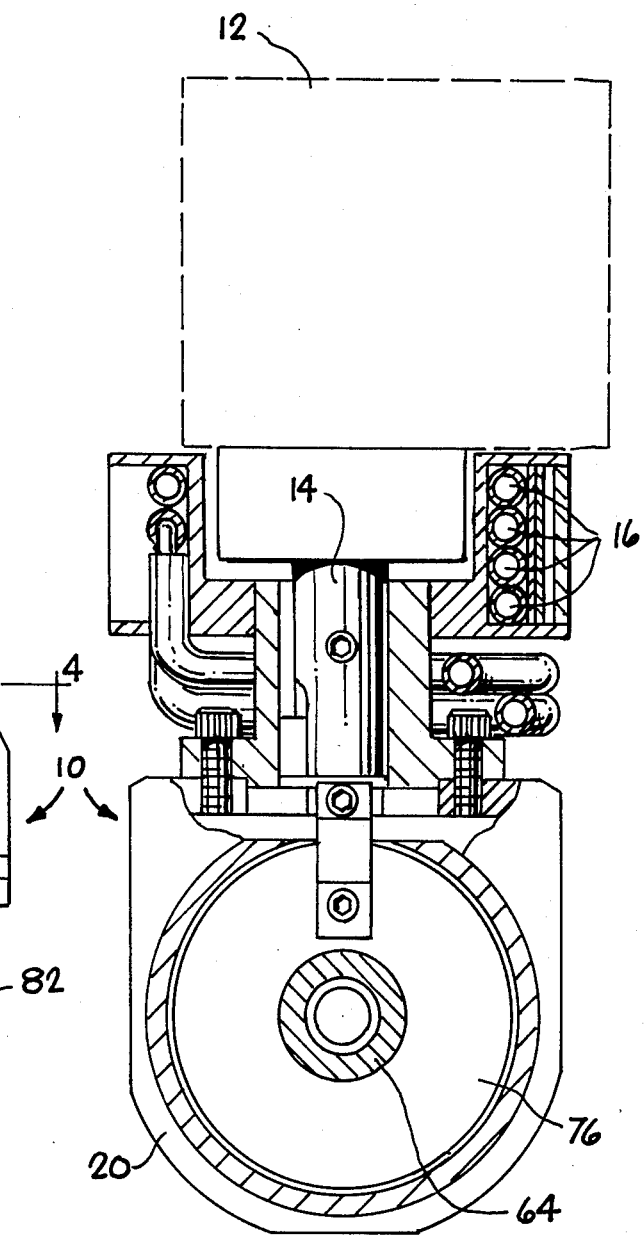

TOOL INTERFACE FOR ROBOT END EFFECTORS

DESCRIPTION

1. Technical Field

The present invention relates to a tool interface for robot end effectors in which tools are held by a socket-type chuck and in particular to an interface in which fluid pressure actuates the chuck jaws.

2. Background Art

Robots are used in manufacturing to automatically perform repeatedly, quickly and flawlessly, tasks that would quickly become monotonous to human workers. They are also used in environments that are hazardous to humans, such as in the handling of radioactive material, or where the presence of human workers is undesirable, such as in clean rooms. In each of these applications, it is desirable that the robot hand or end effector be able to accommodate various tools often having different geometries. If the robot is to automatically change tools, an angular position sensor and indicator for tool pickup and orientation is required. Besides the gripping of the workpieces, the workpieces themselves usually need hydraulic, pneumatic, vacuum or electrical connections to operate. These connections should be intelligently controlled through the robot arm.

Prior art robots, especially those with mechanically operated hands, often require complex tooling or multiple robots to accommodate varying workpieces. They do not have the flexibility to interchange tools that is needed for expanded software and applications capabilities. Prior art robots also have cumbersome umbilical cords that make hydraulic, pneumatic, vacuum and electrical connections to the piece difficult. The cords can also interfere with robot motion. Since they are exposed, the cords can be easily damaged.

In U.S. Pat. No. 4,094,521, Piotrowski teaches a collet chuck in which a hydraulic piston operates in opposition to compression springs for releasing the tool clamping pressure on the collet. An actuator and the collet have contacting inclined surfaces. The springs force the actuator to the right, causing the collet to forced radially inward, clamping the workpiece. Fluid pressure forces the piston to move left against the actuator, which releases the workpiece. An advantage of this chuck is that, should the line supplying fluid pressure become damaged, gripping of the workpiece will not fail because fluid is only used during a tool change. However, the chuck is not readily useable on a robot. Since it allows feed through of the tools, all of the actuating elements must be located off the center of the axis. This makes the chuck too bulky for robots. Such a chuck has too much of a moment of inertia for precise control of the orientation of a tool during rotation.

It is an object of the invention to provide a tool changer in which tools can be switched quickly and easily.

It is an object of the present invention to provide tool interface for robot end effectors that can use various tools without retooling, which can be precisely oriented, and which is reliable. Disclosure of Invention The above objects have been met with a tool changer for use in a tool interface of a robot end effector and having a fail-safe fluid pressure tool release mechanism. The tool changer is a chuck, rotatable about a longitudinal axis, and having a socket on that axis. The chuck has a means for securing a tool in the socket, such as spring jaws for clamping the tool inserted in the socket. The spring jaws may be a tubular body made of resilient material which is split longitudinally at the front end and integrally united at the opposite end of the tube. The jaws have an inclined surface at the split end.

A sleeve in the socket fits around the spring jaws and slides forward longitudinally into wedging engagement with the jaws by an inclined surface contact. A means for pushing the sleeve, such as a spring, is in contact with one end of the sleeve for causing this engagement, thereby securing the tool in the socket.

A fluid pressure mechanism, such as a piston in contact with the spring and a pressurized fluid supply, works against the spring, pushing it back longitudinally away from the sleeve. The piston has an annular portion spaced around the sleeve, and a radial portion, integrally connected to the annular portion, extending radially toward the socket wall. The space between the two piston portions and the socket walls form a chamber for the introduction of fluid, such as air, under pressure. When the fluid is introduced into the chamber, the piston moves back longitudinally against the spring, forcing it away from the sleeve. The sleeve then slides back, disengaging from the jaws' inclined surface, releasing the tool.

The tool interface for a robot hand is made up of the tool changer just described, a means for rotating the tool changer about its longitudinal axis, an angular position sensing and encoding means, and hydraulic, pneumatic, and/or electrical connections for the tools. The tool changer is rotated by a shaft connected to it and to a motor. The shaft is preferably not coupled directly to the motor but is instead coupled through a harmonic wave generator.

An advantage of the tool changer of the present invention is that it is safe against line ruptures. Since pressure is needed to release the tool, the tool will not come undone if the line breaks. The tool changer can be accurately oriented, since the actuating elements are located on the longitudinal axis of the interface, making it easy to control rotation. Accurate position sensing allows the robot to make automatic tool changes.

BRIEF DESCRIPTION OF THE DRAWINGS

FIG. 1 is an exterior side view of the tool interface of the present invention.

FIG. 2 is an exterior rear view of the tool interface of the present invention.

FIG. 3 is an exterior front view of the tool interface of the present invention.

FIG. 5 is a sectional view taken along the line 5—5 in FIG. 4.

FIG. 6 is a sectional view taken along the line 6—6 in FIG. 4.

BEST MODE FOR CARRYING OUT THE INVENTION

Figure 4:
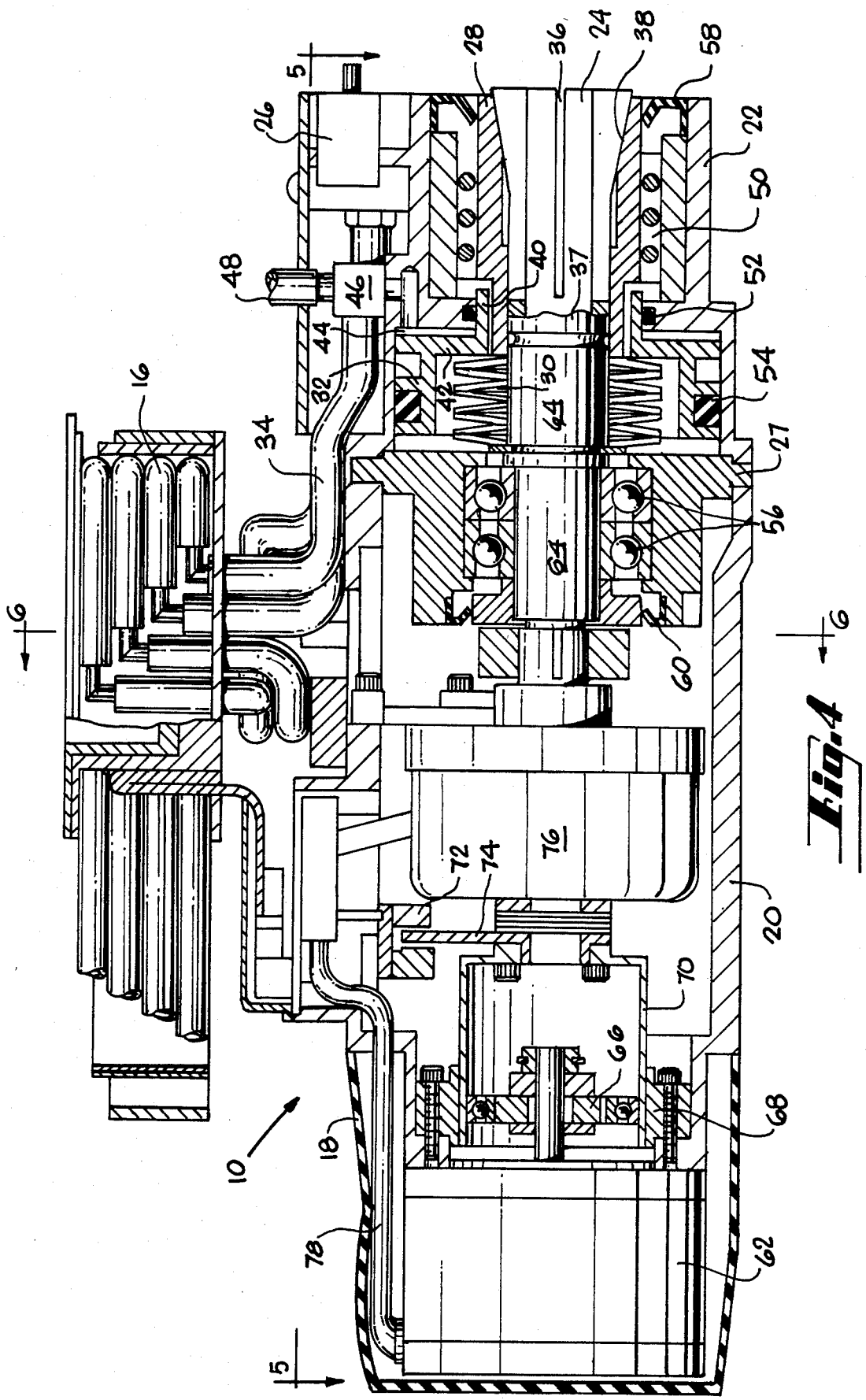
FIG. 4 is a sectional view taken along the line 4—4 in FIG. 3.

With reference to FIGS. 1, 2, and 3, a tool interface 10 is connected to a robot end effector 12 by a wrist 14. Fluid supply lines 16 provide pressurized liquid or gas or provide a vacuum to the tool interface 10 and tools. Electrical lines, not shown, provide electric power to the tool interface 10 and tools. A heat sink 18 is in the rear of the interface surrounding a motor. The heat sink 18 allows excess heat to escape, keeping the motor from overheating. A rear housing 20 and a front housing 22 covers the rest of the tool interface. The center of the tool interface 10 from heat sink 18 to spring jaws 24 defines a longitudinal axis. Spring jaws 24 are means for clamping a tool to the tool interface 10. The jaws 24 are only partly seen as they are inserted in a socket in the front portion of the tool interface. Four jaws are seen but other numbers of jaws are possible. A connector block 26 above the jaws provide convenient link up with the electrical and fluid supply lines 16 without cumbersome umbilical cord connections.

The tool interface 10 is made up of a tool changer, a means for rotating the tool changer, and angular position sensing and encoding means. The tool changer is that portion of the interface 10 enclosed by the front housing 22. In FIG. 4, the tool changer has a socket defined by front housing 22 and socket bottom 27. In the socket are spring jaws 24, sleeve 28, spring 30, piston 32, part of shaft 64, and bearings 50, 52 and 54. Jaws 24 are a tubular body 24 of resilient material split longitudinally at the front end 36 of the tubular body and integrally united at the opposite end 37. The splits in end 36, which are usually four in number, allow the jaws to flex inwardly. The jaws have an inclined surface 38 on the outside of the tubular body at the split end 36. A sleeve 28 is a generally tubular body that fits around the jaws. The inside of the sleeve 28 has an inclined surface 38 corresponding to the inclined surface on the outside of the jaws. The sleeve slides longitudinally on bearings 50 and the outer surface of jaws 24. When the sleeve 28 is forward, it wedges between socket seals 58 and inclined surface 38, pushing jaws inwardly against a tool. A spring 30 is positioned behind sleeve 28 in contact with the end of the sleeve. The spring 30 pushes against the sleeve 28, sliding the sleeve forward into engagement with the inclined surface 38 of the jaws 24.

A piston 32 and fluid supply 34 form a fluid pressure mechanism for releasing a tool from the jaws 24. The piston 32 has an annular portion 40 radially spaced outside of the sleeve 28. The piston 32 has a radial portion 42 that is integrally connected to one end of the annular portion 40. The radial portion 42 is in contact with spring 30 just outside the spring contact to the sleeve 28. The annular and radial portions 40 and 42 together with the inside of the front housing 22 form the walls of a chamber 44.

Fluid from pressurized line 34 enters chamber 44 by way of valve 46. The fluid is preferably air. When the fluid enters chamber 44 the pressurized fluid forces piston 32 back against spring 30. The spring 30 then no longer presses against sleeve 28, so the sleeve slides back, disengaging from the inclined surface 38 of the jaws 24. The jaws 24 no longer securely holds the tool, so the tool can now be replaced. When fluid leaves the chamber through valve 46 and line 48, piston 32 no longer presses against spring 32, allowing the spring 30 to again cause sleeve 28 to engage the jaws 24.

Thus spring 30 and piston 32 work in opposition to each other. Spring 30 acts to secure a tool in the jaws 24, while piston 42 acts to disengage the tool from the jaws 24. Tools disengage only when pressured fluid from line 34 enters chamber 44 and pushes back the piston 42. At all other times, the tools are secure.

The tool changer is rotatable about the longitudinal axis on bearings 50, 52, 54, and 56. Seals 58 and 60 keep dirt out of the tool changer which would increase friction and wear. A motor 62 is a means for rotating the tool changer, and is coupled to a shaft 64 of the tool changer for transferring rotational energy to the tool changer. Electrical connection 78 supplies electric power to motor 62.

The motor 62 is not usually directly coupled to shaft 64, but is coupled via a harmonic wave generator 66 and splines 68 and 70. Flexible spline 70 connects to shaft 64. This coupling reduces the speed of rotation and allows force control over the rotation. Harmonic wave generators with flexible splines are well known non-gear transmissions.

The tool interface 10 has an angular position sensor 72 and 74 and encoder 76 which determines the angular orientation of the tool changer with respect to a reference orientation. The sensor may be an inductosyn having sliding arm 74 attached to the flexible spline 70 and a sensing mechanism 72. Inductosyns use electromagnetic induction to precisely determine the location of arm 74 with respect to the sensing mechanism 72, and are well known in the art. Other types of precise angular position sensors may also be used. The position is encoded into a format readable by the robot controller by an encoder 76, and the encoded signal is relayed by electrical connections to the robot controller, not part of this invention. Methods of encoding the angular position are well known and vary according to the particular type of sensor used.

In FIGS. 5 and 6, the arrangement of fluid supply lines 16 protects the lines from damage and keeps them from getting tangled. The lines 16 come forward parallel to robot arm 12 and go around wrist 14 until they head back in a direction opposite to that which they come in. The lines 16 then drop toward the tool interface 10 and diverge toward their various connections. Line 34 supplies pressurized fluid, such as air, to the piston chamber 44, in FIG. 4. Line 48, in FIG. 5, evacuates the fluid from the chamber. The other two lines 80 and 82 connect to a secured tool via connector block 26. They may be pressurized, vacuum, or alternate between the two.

We claim:

1. A tool interface for a robot end effector comprising
    a tool changer rotatable about a longitudinal axis and having a socket on the longitudinal axis with means for clamping a tool in said socket,
    sleeve means for engaging said means for clamping,
    means axially positioned behind said sleeve means for pushing said sleeve means into engagement with said clamping means,
    a piston having an annular portion radially spaced from said sleeve, and a radial portion integrally connected to said annular portion and spaced apart from walls of said socket to form a chamber, said radial portion being in contact with said pushing means in a position capable of pushing longitudinally back against said pushing means, and a fluid supply line for supplying pressurized fluid to said chamber, said piston and said fluid supply line forming a fluid pressure means for forcing said pushing means away from said sleeve means and releasing a tool from said clamping means, and
    means disposed on said longitudinal axis for rotating said tool changer about said longitudinal axis.

2. The tool changer of claim 1 wherein said means for clamping tool comprises,
    spring jaws inserted in a socket of said tool changer, said jaws being a tubular body of resilient material split longitudinally at one end of the tubular body and integrally united at an opposite end of the tubular body, said jaws having an inclined surface at the split end.

3. The tool changer of claim 1 wherein said means for pushing said sleeve means comprises, a spring in contact with one end of said sleeve means, said spring having an axis coinciding with said longitudinal axis.

4. A tool interface for a robot end effector comprising, a tool changer rotatable about a longitudinal axis and having a socket on said axis with means for securing a tool therein, said tool securing means including spring jaws inserted in said socket and secured therein for clamping said tool, said jaws being a tubular body made of resilient material split longitudinally at one end and integrally united at the opposite end, said jaws having an inclined surface at the split end, an annular sleeve fitting around side spring jaws in said socket, said sleeve being longitudinally slidable against said jaws and against walls of said socket for engaging said jaws at said inclined surface, a spring having a spring axis, said spring axially positioned behind said sleeve in contact with one end of said sleeve for pushing said sleeve into engagement with the jaws, thereby actuating said jaws, said spring axis being the same as the said longitudinal axis, a piston having an annular portion radially spaced from said sleeve, and a radial portion integrally connected to said annular portion and spaced apart from walls of said socket to form a chamber, said radial portion being in contact with said spring in a position capable of pushing longitudinally back against said spring, and a fluid supply line for supplying pressurized fluid to said changer, said piston and said fluid supply line forming a fluid pressure mechanism for pushing said spring longitudinally away from said sleeve thereby disengaging said sleeve from said jaws releasing said tool, and means disposed on said longitudinal axis for rotating said tool changer about the longitudinal axis.

5. The tool interface of claim 4 further comprising, an angular position sensing and encoding means for determining the angular orientation of said tool changer with respect to a reference orientation.

* * * * *